(12) United States Patent
Shao et al.

(10) Patent No.: US 7,693,541 B1  
(45) Date of Patent: Apr. 6, 2010

(54) MULTIMODAL SESSION SUPPORT ON DISTINCT MULTI CHANNEL PROTOCOL

(75) Inventors: Victor Shao, San Diego, CA (US); Curtis Tuckey, Chicago, IL (US); Jeremy Chone, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2514 days.

(21) Appl. No.: 10/095,803

(22) Filed: Mar. 19, 2002

Related U.S. Application Data

(60) Provisional application No. 60/306,704, filed on Jul. 20, 2001.

(51) Int. Cl.  
*H04M 1/00* (2006.01)

(52) U.S. Cl. .................... 455/552.1; 455/450

(58) Field of Classification Search ............ 455/552.1, 455/556.1, 450, 455
See application file for complete search history.

(56) References Cited

U.S. PATENT DOCUMENTS

| | | | |
|---|---|---|---|
| 4,755,930 A | 7/1988 | Wilson et al. | |
| 5,564,070 A | 10/1996 | Want et al. | |
| 5,715,399 A | 2/1998 | Bezos | |
| 5,960,411 A | 9/1999 | Hartman et al. | |
| 5,963,932 A | 10/1999 | Jakobsson et al. | |
| 6,125,352 A | 9/2000 | Franklin et al. | |
| 6,189,029 B1 | 2/2001 | Fuerst | |
| 6,192,380 B1 | 2/2001 | Light et al. | |
| 6,199,079 B1 | 3/2001 | Gupta et al. | |
| 6,304,898 B1 | 10/2001 | Shiigi | |
| 6,324,266 B1 | 11/2001 | Mannings | |
| 6,341,353 B1 | 1/2002 | Herman et al. | |
| 6,378,075 B1 | 4/2002 | Goldstein et al. | |
| 6,421,693 B1 | 7/2002 | Nishiyama et al. | |
| 6,457,045 B1 | 9/2002 | Hanson et al. | |
| 6,477,504 B1 | 11/2002 | Hamlin et al. | |
| 6,535,885 B1 | 3/2003 | Nardone et al. | |
| 6,556,974 B1 | 4/2003 | D'Alessandro | |

(Continued)

FOREIGN PATENT DOCUMENTS

WO    WO 00/03554 A1    1/2000

(Continued)

OTHER PUBLICATIONS

IP Australia, "Examiner's First Report," App. No. 2002365114, Received on Jan. 30, 2007, 2 pages.

(Continued)

*Primary Examiner*—Temica M Beamer  
(74) *Attorney, Agent, or Firm*—Hickman Palermo Truong & Becker LLP; Christian A. Nicholes

(57) ABSTRACT

An improved mechanism for sharing information between a non-voice session and a voice session is described. Clients use communication devices to exchange voice information over voice sessions to voice node servers and exchange non-voice information over non-voice sessions to WAP gateways. Information about the activity in a session is stored as context data. When a client switches from communication over one type of session to another, context data for that client is located and retrieved. The retrieved context data is used to recreate the state of the prior session, thus eliminating the need to reenter information that was previously available.

29 Claims, 2 Drawing Sheets

U.S. PATENT DOCUMENTS

| | | | |
|---|---|---|---|
| 6,578,037 | B1 | 6/2003 | Wong et al. |
| 6,601,761 | B1 | 8/2003 | Katis |
| 6,615,131 | B1 | 9/2003 | Rennard et al. |
| 6,618,721 | B1 | 9/2003 | Lee |
| 6,618,746 | B2 | 9/2003 | Desai et al. |
| 6,631,371 | B1 | 10/2003 | Lei et al. |
| 6,651,217 | B1 | 11/2003 | Kennedy et al. |
| 6,668,167 | B2 | 12/2003 | McDowell et al. |
| 6,701,366 | B1 | 3/2004 | Kallas et al. |
| 6,748,449 | B1 | 6/2004 | Dutta |
| 6,754,635 | B1 | 6/2004 | Hamlin et al. |
| 6,763,344 | B1 | 7/2004 | Osentoski et al. |
| 6,807,532 | B1 | 10/2004 | Kolls |
| 6,826,540 | B1 | 11/2004 | Plantec et al. |
| 6,986,060 | B1 | 1/2006 | Wong |
| 7,117,197 | B1 | 10/2006 | Wong et al. |
| 2001/0011250 | A1 | 8/2001 | Paltenghe et al. |
| 2001/0011274 | A1 | 8/2001 | Klug et al. |
| 2001/0025245 | A1 | 9/2001 | Flickinger et al. |
| 2001/0027439 | A1 | 10/2001 | Holtzman et al. |
| 2001/0047292 | A1 | 11/2001 | Montoya |
| 2001/0052122 | A1 | 12/2001 | Nanos et al. |
| 2002/0002482 | A1 | 1/2002 | Thomas |
| 2002/0004783 | A1 | 1/2002 | Paltenghe et al. |
| 2002/0007303 | A1 | 1/2002 | Brookler et al. |
| 2002/0052774 | A1 | 5/2002 | Parker et al. |
| 2002/0057678 | A1 * | 5/2002 | Jiang et al. ............... 370/353 |
| 2002/0059218 | A1 | 5/2002 | August |
| 2002/0065774 | A1 | 5/2002 | Young et al. |
| 2002/0073166 | A1 | 6/2002 | Lynch |
| 2002/0095405 | A1 | 7/2002 | Fujiwara |
| 2002/0107726 | A1 | 8/2002 | Torrance |
| 2003/0014394 | A1 | 1/2003 | Fujiwara et al. |
| 2004/0024656 | A1 | 2/2004 | Coleman |
| 2004/0043770 | A1 | 3/2004 | Amit |
| 2004/0093257 | A1 | 5/2004 | Rogers et al. |
| 2004/0139043 | A1 | 7/2004 | Lei et al. |
| 2004/0193479 | A1 | 9/2004 | Hamlin et al. |
| 2005/0071219 | A1 | 3/2005 | Kahlert et al. |

FOREIGN PATENT DOCUMENTS

| | | |
|---|---|---|
| WO | WO 01/10080 A2 | 2/2001 |
| WO | WO 01/43390 A2 | 6/2001 |
| WO | WO 02/15519 A2 | 2/2002 |

OTHER PUBLICATIONS

State Intellectual Property Office of P.R.C., "Notification of the First Office Action," Application No. 02814466.X, dated Jul. 22, 2005, 4 pages.

Current Claims, Application No. 02814466.X, Claims 1-24, 4 pages.

Yahoo!; What is Yahoo! Wallet?; Oct. 18, 2000; retreived from the Internet Archives (http://www.archive.org) at http://web.archive.org/web/20001018070000/help/wallet/wallet-07.html.

Just Deals.com; Order Confirmation; Retrieved from http://weinbeck.mit.edu/keyboard.pdf.

Boutlon, Clint; Yahoo! Moves to Speed Checkout; Oct. 5, 1999; http://www.internetnews.com/ec-news/article.php/212081.

Crouch, Cameron; Yahoo Shopping Goes Express; Oct. 6, 1999; PC World.

Barnett, Megan; 1999: Year of the E-Wallet; Jun. 30, 1999; PC World.

Yahoo Media Relations; Yahoo! Makes Online Shopping Easier for Consumers; Oct. 5, 1999; Yahoo Press Release.

Yahoo Media Relations; Yahoo! Shopping Now Available on Web-Enabled Phones; Nov. 22, 2000; Yahoo Press Release.

Patterson et al; Computer Organization & Design; The Hardware/Software Interface: 1999; Morgan Kaufmann Publishers, Inc; Second Edition; pp. 575-576.

Christer Erlandson, et al., "WAP—The wireless application protocol," Ericsson Review No. 4, 1998, XP-000792053, pp. 150-153.

* cited by examiner

MULTIMODAL SESSION SUPPORT ON DISTINCT MULTI CHANNEL PROTOCOL

PRIORITY CLAIM

This patent application claims priority from U.S. Provisional Patent Application No. 60/306,704, filed on Jul. 20, 2001, entitled MULTIMODAL SESSION SUPPORT ON DISTINCT MULTICHANNEL PROTOCOL, the content of which is hereby incorporated by reference in its entirety.

FIELD OF THE INVENTION

This invention relates generally to communication systems, and more particularly to a mechanism to share session between different interaction channels.

BACKGROUND OF THE INVENTION

The use of wireless technology has quickly become an accepted and popular method of enabling communication. Many enjoy mobile devices for the convenience of engaging in conversation from any location. Wireless carriers, in addition to offering voice communication, have begun to provide a variety of services. These services, in many cases, extend the capability of Internet applications to the wireless environment. For example, many people access the Internet through a cell phone to obtain stock quotes, make purchases, or receive driving directions.

A communications device that is exchanging voice information with another communications device does so over a voice session. In other words, the interaction that takes place during a voice session involves audible audio. In contrast, audible audio is not the mode of interaction in a non-voice session. Typically, the interaction in non-voice sessions involves visual interaction, such as displaying a menu on a browser.

For example, when accessing visual information on the Internet through a mobile phone, the communication takes place over a non-voice session. A session, as used herein, is a general term referring to a period during which a device is being used for a particular type of information exchange. For example, during a voice session on the mobile phone, the mode of communication involves audible audio. During a non-voice session on the mobile phone, the mode of communication involves something other than audible audio.

When communicating over one type of session, it is sometimes desirable to switch to another type of session to continue a related activity in another mode or channel. For example, the Internet includes several on-line music stores. In a single channel environment, the user can search, browse, select and listen music to from the single channel or mode. For example, all of these actions may be done over a voice channel by dialing a 1-800 number, or all may be done over a non-voice channel using a phone-based browser.

When a device supports both types of sessions, it would be convenient to allow the user to do some of these tasks in a specific mode and some others in another mode. For example, the user can start the service from visual mode for browsing and selecting, using his device keypad to select the appropriate song, then when the user clicks on the song, the device would shift to have voice mode to listen to the song.

Another example in which the ability to switch between session types would be helpful is an email application. A user should be able to browse his email list, and when clicking on a specific email, he can listen to the content of it. Note that here the content (Data) of the email is text, but because the user shifts to a voice mode, the interaction will be voice.

Unfortunately, with today's devices and networks, when a device shifts from one mode to another (e.g. from a non-voice to a voice session), the transaction is not kept. In other words, the user cannot save context data, or information that indicates the state of recent activity. Thus, as context data cannot be saved across sessions, it is necessary to reenter any information needed in the new session that was used or available in the old session. For example, in the online music store example, it is necessary to identify oneself and the music selection one would like to hear in the voice session, even though the user may have already entered that information in the non-voice session. The inconvenience of data re-entry is significant due to the relatively unsophisticated input mechanisms that most mobile device possess.

The problem of data reentry also occurs when switching from a voice session to a non-voice session. For example, when speaking on the phone with a salesperson, it would be desirable to switch to the salesperson's web site to immediately view product and sales information presented in a customized manner according to the conversation with the salesperson. Unfortunately, after a voice conversation with a salesperson, it is currently necessary to navigate through a corresponding web site manually without benefit of any prior conversation.

Reentering information can be a time consuming and repetitive act. It is desirable to eliminate the necessity to reenter information when switching from one type of session to another. Currently, however, there is no effective mechanism for doing so.

SUMMARY

To overcome the shortcomings of the prior art, the present invention provides an improved mechanism for maintaining transactions between different communication modes (e.g. voice sessions and non-voice sessions). According to one aspect of the present invention, information about the activity in a session is stored as context data. When a client switches from one type of session to another, context data for that client is retrieved. The retrieved context data is used to recreate the state of the prior session, thus eliminating the need to reenter information that was previously available.

According to another aspect, the information thus stored is available for use in the new session of the same type. Thus, a user may switch from a non-voice session to a voice session then back to a non-voice session. The latter non-voice session can start in the state indicated by the state data saved for the earlier non-voice session in a manner transparent to the user. The ease of use and the efficiency of activities in the new session is greatly increased. Hence, the present invention represents a significant improvement over the prior art.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT(S)

Techniques are provided for sharing information between a non-voice session and a voice session. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
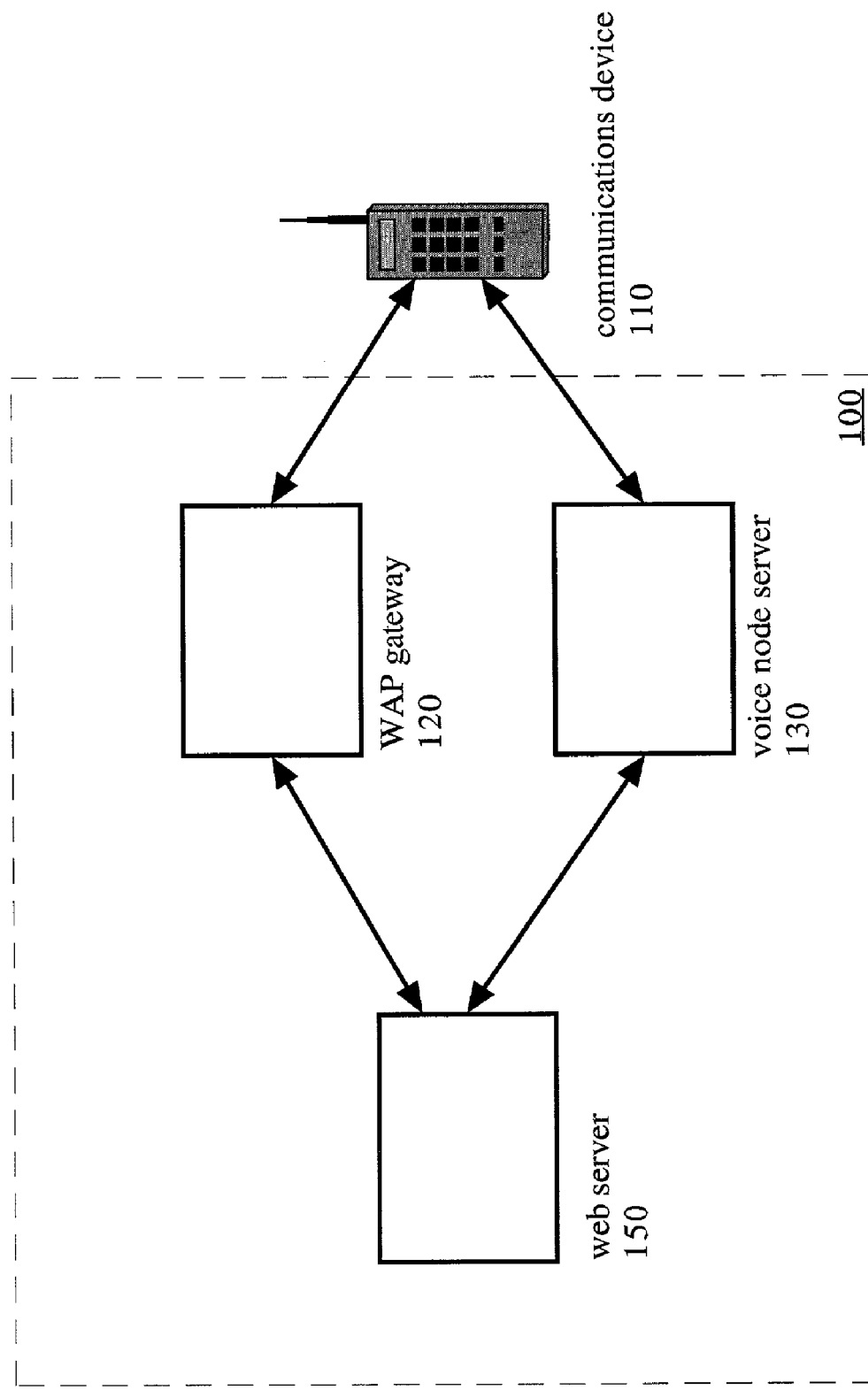
FIG. 1 a functional block diagram of a system 100 in which one embodiment of the present invention may be implemented.

With reference to FIG. 1, there is shown a functional block diagram of a system 100 in which one embodiment of the present invention may be implemented, the system 100 comprising a WAP gateway 120, a voice node server 130, and a web server 150. The system 100 is coupled to a communication device 110. For the sake of simplicity, only one communication device 110 is shown; however, it should be noted that multiple communication devices 110 may be coupled to, and communicate with, the WAP gateway 120 or the voice node server 130. For the purpose of the present invention, communication device 110 may be any mechanism capable of communicating with the WAP gateway 120 and the voice node server 130, including but not limited to cell phones or personal computers. The communication device 110 may present information using any known protocol, including but not limited to WML, HDML, and PQA. The communication device 110 may communicate with the WAP gateway 120 and the voice node server 130 using any known protocol, including but not limited to WTP ("wireless transfer protocol").

The WAP gateway 120 is the component responsible for sending and receiving non-voice information to the communications device 110 in a non-voice session. More specifically, the WAP gateway 120 sends and receives non-voice information from the web server 150 in one protocol, and sends and receives non-voice information from the communication device 110 in another protocol. In one embodiment, the WAP gateway 120 communicates to the web server 150 over a physical connection, and communicates to a communication device 110 over a wireless connection. The WAP gateway 120 may communicate with the web server 150 using any known protocol, including but not limited to HTTP.

The voice node server 130 is the component responsible for sending and receiving voice information to the communications device 110 in a voice session. The voice node server 130 is responsible for authenticating transmissions from the communications device 110. The voice node server 130 may communicate with the web server 150 using any known protocol, including but not limited to HTTP.

The web server 150 is the component responsible for processing requests for information from communication device 110. This information includes voice information from a phone call or non-voice information requests. The web server 150 may service the non-voice information requests by accessing static files, processing server-parsed entities, executing one or more applications, or by accessing content providers. The web server 150 may service the voice information requests by establishing voice calls with other parties.

Functional Overview

State information detailing recent activity in either a voice session or a non-voice session is saved as context data by the web server 150. The context data is then made available to one or more subsequent sessions. The subsequent sessions that make use of the saved context data may be the same type or a different type than the session in which the context data was saved.

For example, assume that a mobile phone user is browsing a music store site in a non-voice session. The user may pull up information about a particular CD, and desire to hear a sample of the CD from a voice-session based music service. Context data from the non-voice session that identifies the particular CD is stored prior to switching to the voice session. The user then switches to the voice-session and accesses the music service. The music service may detect the existence of the stored context data and provide the user the option of using a conventional voice-based mechanism to identify a CD, or to read the CD information stored in the context data. If the user specifies the use of the context data, then the music service plays a sample of the CD identified in the context data.

After listening to the sample, the user may wish to return to browsing CDs at the online store. Upon switching to a non-voice session, the context data may be used to start the new session at the same point that the user was at when the user switched to the voice session.

Context Data

Context data for a non-voice session may include, but is not limited to, data that indicates recent history of sites visited over the Internet, recent purchases made, etc. Similarly, context data for a voice session may include recent options selected in a voice menu, and recent topics discussed in conversation with another person (such information about the conversation may be stored electronically by a participant of the conversation), etc.

In some embodiments, context data is stored for recent activity of a particular communication device 110. In other embodiments, context data is stored for recent activity for each user of a communication device 110.

In one embodiment, the context data is saved at fixed time intervals. In another embodiment, the context data is saved anytime there is new activity in the session. The saving of the context data for a session may also be performed, for example, in response to a switch to a different type of session.

Saving Context Data

According to one embodiment, context data is saved by the web server 150 using a cookie or other well-known mechanism to store data in a fixed medium. For example, on an Internet http communication, the sessionID is passed in the cookie between the client and server. This sessionID allows the server to index any information for this communication.

In this multi-modal world, the challenge is to keep the same session across the multiple modes. Multiple modes often assume that there is multiple IDs. For example, in a voice mode there may be a VoiceID (which is usually the phone number), in a VisualBrowser mode (WAP Browser) this could be a subscriberID (the "VisualBrowserID").

According to one embodiment, a common ID is used between the different modes, such as to map the "Mode"-IDs to the same session. Most of the visual browsers, WAP Browser, support the well known cookie features, which allow the server to pass some information for a given session (multiple consecutive request). However, some other modes (e.g. Voice), do not have this support. Therefore, the mobile application server has to be flexible in the ways it manages device/mode IDs. Because the Cookies tend to be the easiest mechanism to store small information across request, in one embodiment the server uses this mechanism when it can for VoiceID, VisualBrowserID and SessionID.

Using the Context Data

When a communications device 110 initiates a new type of session, the request is received by the voice node server 130 if the desired session is a voice session, and is received by the WAP gateway 120 if the desired session is a non-voice session. In one embodiment, upon receiving the request for a new session, the WAP gateway 120 and the voice node server 130 identify the particular communication device 110 where the request originated, and contact the web server 150 to determine if there is any stored context data for the particular requesting communication device. This is performed in one embodiment by examining the phone number used to establish a voice session and using a look up table to determine the requesting communication device 110. In another embodiment, upon receiving the request for a new session, the WAP gateway 120 and the voice node server 130 identify the particular user of the communication device 110 where the request originated, and contact the web server 150 to determine if there is any stored context data for the particular requesting user.

In the particular example of a Visual-to-Voice mode switch, the server maps the VisualID to the VoiceID. For example, some of the WAP Servers do not support cookies, therefore the VisualID needs to be something else that uniquely identifies the session or at least the device. In this particular WAP Case, the SubscriberID can be used as the DeviceID.

If context data is available, then the context data is retrieved from the web server 150 and made available for use in the new session. In other words, if the new session requested is a voice session, then the context data is transmitted from the web server 150 to the voice node server 130, and information in the context data is used by the voice node server 130 in the new voice session. When the user switches from Visual to Voice, unfortunately, most of the time, the SubscriberID is not the same. In the case of Voice, the deviceID becomes the phone number. Therefore, the system synchronizes the SubscriberID with the PhoneNumber so that it can recognize that it's the same session.

Accordingly, if the new session requested is a non-voice session, then the context is transmitted from the web server 150 to the WAP gateway 120, and information in the transmitted context data is used by the WAP gateway 120 is the new non-voice session. The service that receives the context data may use the context data automatically in a manner that is transparent to the user, or may provide the user the option of using the context data or entering data in some other way. In one embodiment, multiple instances of context data may exist, and the user may be presented with the option of selecting which, if any, context data that the service is to use.

When context data is used as input to a service, the user avoids the hassle of having to enter the data manually. Because entry of data into mobile devices is often awkward and tedious, the techniques described herein for avoiding the need to re-enter data provide significant benefit to mobile device users.

Hardware Overview

Figure 2:
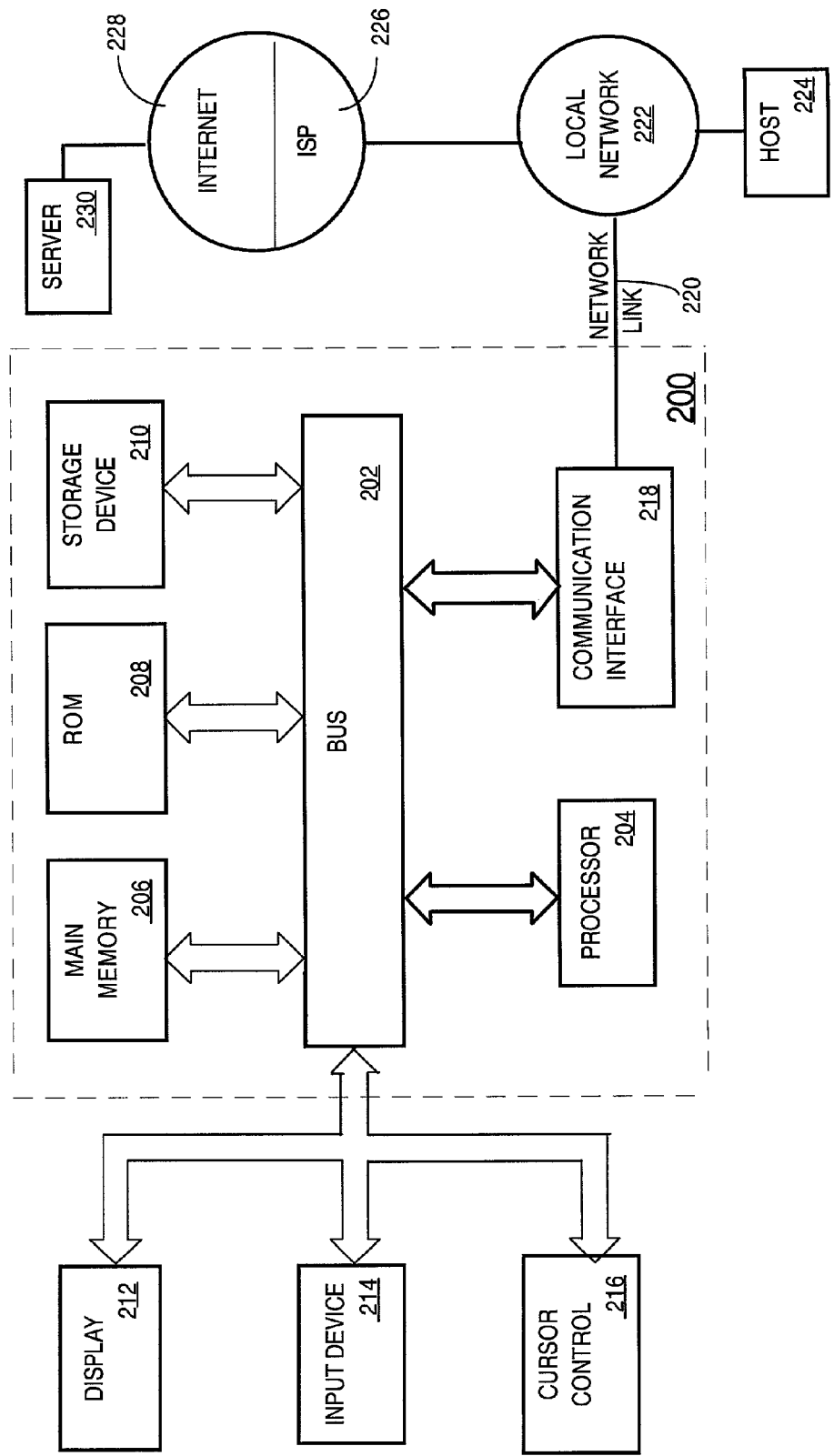
FIG. 2 is a block diagram that illustrates a computer system 200 upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for generating a digital video content. According to one embodiment of the invention, a digital video content is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The execution of the sequences of instructions required to practice the invention need not be performed by a single computer system 200. The sequences of instructions required to practice the invention may be performed by a plurality of computer systems 200 connected to local network 222, connected to the Internet 228, or otherwise in data communication with each other.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 1128. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit requested program code for an application program through Internet 228, ISP 226, local network 222 and communication interface 218

Processor 204 may execute the received code as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for sharing information between a voice session and a non-voice session, the method comprising steps of:

storing context data for a user communicating over a first type of session, said first type of session being one of a voice session and a non-voice session;

wherein the context data reflects the context of the first type of session;

receiving a request from said user to initiate communication over a second type of session, said second type of session being the other of a voice session and a non-voice session than said first type of session;

retrieving said context data;

selecting information from the retrieved context data;

providing the selected information to a service accessed in said second type of session; and the service accessed in said second type of session utilizing the selected information;

wherein said steps are performed by one or more computing devices.

2. The method of claim 1, wherein the step of storing context data is performed in response to switching from said first type of session to said second type of session.

3. The method of claim 1, wherein said first type of session is a voice session and said second type of session is a non-voice session.

4. The method of claim 1, wherein said first type of session is a non-voice session and said second type of session is a voice session.

5. The method of claim 1, wherein said step of storing context data includes storing context data in association with an identifier associated with said user; and said step of retrieving said context data includes retrieving said context data based on said identifier associated with said user.

6. A computer-implemented method for sharing information between a voice session and a non-voice session, the method comprising steps of:

storing context data for a user communicating over a first type of session, said first type of session being one of a voice session and a non-voice session;

receiving a request from said user to initiate communication over a second type of session, said second type of session being the other of a voice session and a non-voice session than said first type of session;

retrieving said context data; and providing information from said context data to a service assessed in said second type of session;

wherein said context data reflects the context of said first type of session;

said step of storing context data includes storing context data in association with an identifier associated with said user; and said step of retrieving said context data includes retrieving said context data based on said identifier associated with said user;

wherein said identifier is associated with a phone number of a device used by said user to request said second type of session;

wherein said steps are performed by one or more computing devices.

7. The method of claim 1, wherein said step of storing context data for a user is performed by using a cookie.

8. The method of claim 1, wherein said context data is stored on a web server.

9. The method of claim 1 further comprising the steps of:

receiving a request from said user to switch from said second type of session back to said first type of session;

after switching back to said first type of session, performing the steps of retrieving said context data; and providing information from said context data to a service assessed in said first type of session.

10. The method of claim 1 wherein the step of storing context data is performed at periodic intervals.

11. The method of claim 1 wherein the step of storing context data is performed in response to new activity within said first type of session.

12. The method of claim 3 wherein the step of storing context data is performed in response to a participant in said voice session entering data related to said voice session.

13. A volatile or non-volatile computer-readable storage medium storing instructions for sharing information between a voice session and a non-voice session, the instructions including instructions for causing one or more processors of one or more computing devices to perform the steps of:
 storing context data for a user communicating over a first type of session, said first type of session being one of a voice session and a non-voice session;
 wherein the context data reflects the context of the first type of session;
 receiving a request from said user to initiate communication over a second type of session, said second type of session being the other of a voice session and a non-voice session than said first type of session;
 retrieving said context data;
 selecting information from the retrieved context data;
 providing the selected information to a service accessed in said second type of session; and
 the service accessed in said second type of session utilizing the selected information;
 wherein said steps, when performed, are performed by said one or more computing devices.

14. The volatile or non-volatile computer-readable storage medium of claim 13, wherein the step of storing context data is performed in response to switching from said first type of session to said second type of session.

15. The volatile or non-volatile computer-readable storage medium of claim 13, wherein said first type of session is a voice session and said second type of session is a non-voice session.

16. The volatile or non-volatile computer-readable storage medium of claim 13, wherein said first type of session is a non-voice session and said second type of session is a voice session.

17. The volatile or non-volatile computer-readable storage medium of claim 13, wherein
 said step of storing context data includes storing context data in association with an identifier associated with said user; and
 said step of retrieving said context data includes retrieving said context data based on said identifier associated with said user.

18. A volatile or non-volatile computer-readable storage medium carrying instructions for sharing information between a voice session and a non-voice session, the instructions including instructions for causing one or more processors of one or more computing devices to perform the steps of:
 storing context data for a user communicating over a first type of session, said first type of session being one of a voice session and a non-voice session;
 receiving a request from said user to initiate communication over a second type of session, said second type of session being the other of a voice session and a non-voice session than said first type of session;
 retrieving said context data; and
 providing information from said context data to a service accessed in said second type of session;
 wherein said context data reflects the context of said first type of session;
 wherein said step of storing context data includes storing context data in association with an identifier associated with said user; and
 said step of retrieving said context data includes retrieving said context data based on said identifier associated with said user;
 wherein said identifier is associated with a phone number of a device used by said user to request said second type of session;
 wherein said steps, when performed, are performed by said one or more computing devices.

19. The volatile or non-volatile computer-readable storage medium of claim 13, wherein said step of storing context data for a user is performed by using a cookie.

20. The volatile or non-volatile computer-readable storage medium of claim 13, wherein said context data is stored on a web server.

21. The volatile or non-volatile computer-readable storage medium of claim 13 further comprising instructions for performing the steps of:
 receiving a request from said user to switch from said second type of session back to said first type of session;
 after switching back to said first type of session, performing the steps of retrieving said context data; and
 providing information from said context data to a service assessed in said first type of session.

22. The volatile or non-volatile computer-readable storage medium of claim 13 wherein the step of storing context data is performed at periodic intervals.

23. The volatile or non-volatile computer-readable storage medium of claim 13 wherein the step of storing context data is performed in response to new activity within said first type of session.

24. The volatile or non-volatile computer-readable storage medium of claim 13 wherein the step of storing context data is performed in response to a participant in said voice session entering data related to said voice session.

25. The volatile or non-volatile computer-readable storage medium of claim 13, further comprising:
 providing a user the option of selecting the information from the retrieved context data.

26. The volatile or non-volatile computer-readable storage medium of claim 13, further comprising:
 automatically selecting the information from the retrieved context data.

27. The volatile or non-volatile computer-readable storage medium of claim 13, further comprising:
 providing a user the option of selecting the information from the retrieved context data.

28. The volatile or non-volatile computer-readable storage medium of claim 13, further comprising:
 automatically selecting the information from the retrieved context data.

29. The volatile or non-volatile computer-readable storage medium of claim 13, further comprising:
 identifying a specific communication device making the request to initiate communication over a second type of session;
 wherein said context data reflects the context of said first type of session; and
 determining if there is any stored context data for the specific communication device.

* * * * *

UNITED STATES PATENT AND TRADEMARK OFFICE
CERTIFICATE OF CORRECTION

PATENT NO. : 7,693,541 B1
APPLICATION NO. : 10/095803
DATED : April 6, 2010
INVENTOR(S) : Victor Shao et al.

Page 1 of 1

It is certified that error appears in the above-identified patent and that said Letters Patent is hereby corrected as shown below:

Title Page, Item (56) on page 2, in column 2, under "Other Publications", line 5, delete "retreived" and insert -- retrieved --, therefor.

Title Page, Item (56) on page 2, in column 2, under "Other Publications", line 8, delete "Retreived" and insert -- Retrieved --, therefor.

In column 7, line 48, delete "218" and insert -- 218. --, therefor.

Signed and Sealed this
Nineteenth Day of April, 2011

David J. Kappos
*Director of the United States Patent and Trademark Office*